Figure 1:
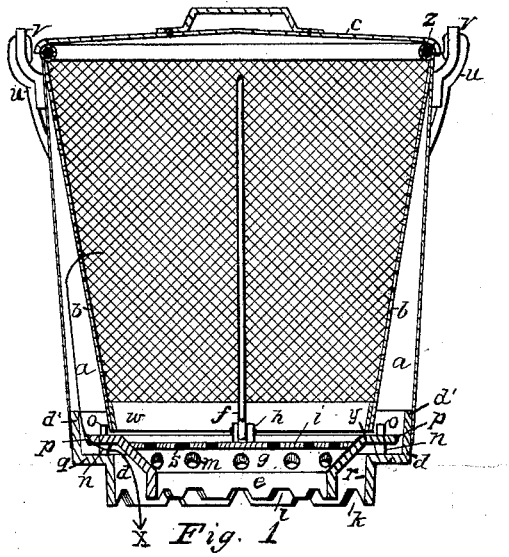

(No Model.)

A. MANSER.
DOMESTIC CREMATOR.

No. 435,184. Patented Aug. 26, 1890.

WITNESSES:
Chas. J. Manser
E. Davis

INVENTOR
Alfred Manser
BY
H. Anderson
ATTORNEY.

UNITED STATES PATENT OFFICE.

ALFRED MANSER, OF SING SING, NEW YORK.

DOMESTIC CREMATOR.

SPECIFICATION forming part of Letters Patent No. 435,184, dated August 26, 1890.

Application filed April 12, 1890. Serial No. 347,718. (No model.)

*To all whom it may concern:*

Be it known that I, ALFRED MANSER, a citizen of the United States, residing at Sing Sing, in the county of Westchester and State of New York, have invented certain Improvements in Domestic Cremators, of which the following is a specification, which I declare to be a full, clear, and exact description of my invention, such as will enable others skilled in the art to which it appertains to make and use the same, reference being had to the accompanying drawings, which form a part of this specification.

My invention relates to garbage-burners for domestic use; and its object is to provide a simple, cleanly, and handy vessel for the purpose, one that can be made and sold cheaply.

The objects are accomplished by the means set forth in the drawings.

Figure 2:
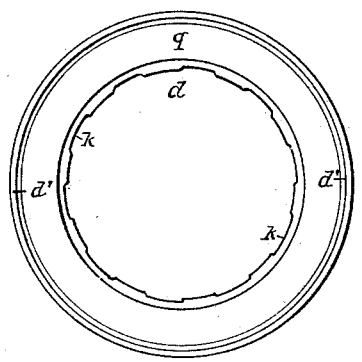
Figure 3:
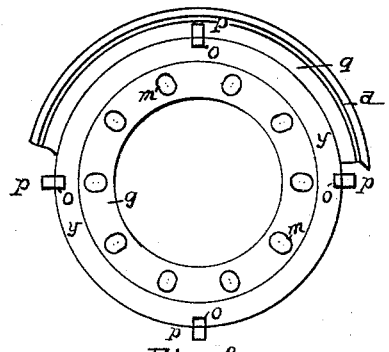
Figure 4:
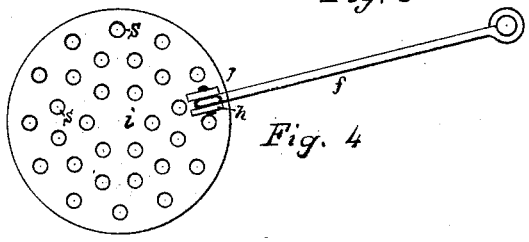

Figure 1 is a vertical cross-section of one of my cremators. Fig. 2 is a plan of the bottom piece of the main vessel. Fig. 3 is a top view of a loose bottom piece, and Fig. 4 is a view of a removable bottom piece.

In constructing this cremator I first provide a pail-like vessel $a$, Fig. 1, made, preferably, of galvanized iron and provided with ears $v$, a bail $u$, and a cover $c$. The bottom $d$, I make, preferably, of cast-iron, and make it fast to the vessel $a$. The bottom has an opening surrounded by a flange $r$ to enter a pot-hole of a stove. The vessel has an inside receptacle $b$, made, preferably, of galvanized-wire netting, the top edge of the vessel being wired and having the wire $z$ turned on the inner edge, as shown. The netting receptacle is made at the top to fit snugly beneath the wire and is made fast to the vessel. The receptacle tapers toward the bottom to a considerably less diameter than the vessel, and has a band $w$ riveted around the bottom inside edge.

Below the receptacle, resting on the bottom $d$, is a loose bottom piece $g$. It has a flange $y$, projecting partly over the horizontal part $q$ of the bottom $d$, from which it is raised by the lugs $n$, of which three or four may be provided. Extending beyond the flange $y$ are lugs $p$, (see Fig. 3,) which aid in keeping the ring concentric with the outside flange $d'$. Other lugs $o$, Figs. 1 and 3, afford some sidewise support to the lower end of the netting receptacle, as is shown in Fig. 1. From the flange $y$ this ring bevels inwardly to a bottom projecting ring $e$. The bevel portion contains perforations $m$.

A removable bottom $i$ is provided to rest within the beveled part of the bottom piece $g$, above the perforations $m$. By reference to Fig. 4 it will be seen that this piece is also full of perforations, and is provided with a handle $f$, hinged at $h$, for the purpose of manipulating it.

Now suppose the cremator to be placed on the stove, everything being in position as in Fig. 1, except that the cover would be removed. The matter to be burned being poured into the vessel, it may be covered and left to dry out, the steam passing through the netting downward between the walls $b$ $a$ and between the bottom pieces $g$ $d$ into the fireplace, the course being indicated by the line $x$, Fig. 1. When it is desired to drop the matter upon the fire, the removable bottom $i$ is removed by means of the handle $f$. The inner bottom piece $g$ being loose is capable of being revolved on its seat by means of the hand or a stove-poker, and any deposits that may form on the bottom part $g$, from drippings or otherwise, may be readily dislodged by giving the piece $i$ a few turns.

The removable bottom $i$ may be dispensed with except when the matter to be burned contains considerable liquid matter. If the matter is first allowed to thoroughly dry or even partially dry, it may be dumped directly on the fire through the cremator, the cremator conducting smoke and vapors back to the fire and allowing the matter to be fed gradually to the fire.

The bottom pieces $d$ and $g$, I make of cast-iron to prevent liability to rust and burn out.

Having described my invention, what I claim, and desire to secure by Letters Patent, is—

1. The combination, in a domestic garbage-burner, of the vessel $a$, containing a fixed netting receptacle $b$, a fixed bottom $d$, and a loose revoluble bottom $c$, substantially as shown and described.

2. The combination, in a domestic garbage burner or cremator, of the vessel $a$, fixed netting receptacle $b$, and cast bottom $d$, with the revoluble bottom $g$, substantially as shown and described.

3. The combination, in a domestic garbage burner or cremator, of the vessel $a$, netting receptacle $b$, cast bottom $d$, revoluble bottom piece $g$, and removable bottom $i$, substantially as herein shown and described.

4. The combination, in a domestic cremator, of the following elements: a vessel $a$, provided with a cover $c$ and a cast bottom $d$, having a plane surface extending inwardly and terminating in a depending flange $r$, the said vessel having its top edge wired inwardly, a wire-netting receptacle $b$, fitting closely under the wired edge and secured thereto, the said netting receptacle terminating in a less diameter than the corresponding part of the vessel $a$, a loose bottom piece $y$, supported on lugs $n$ and kept in a central position within the main bottom by means of lugs $p$ and lugs $o$, to prevent the netting receptacle from displacement sidewise, and a removable bottom $i$, provided with a handle $f$, substantially as shown and described.

ALFRED MANSER.

Witnesses:
CHAS. F. MANSER,
E. DAVIS.